N. D. STURGES.
BATTERY SEAL.
APPLICATION FILED APR. 24, 1918.

1,325,338.

Patented Dec. 16, 1919.

Inventor
Norman D. Sturges
By his Attorney
Walton Harrison

UNITED STATES PATENT OFFICE.

NORMAN D. STURGES, OF BROOKLYN, NEW YORK, ASSIGNOR TO MULTIPLE STORAGE BATTERY CO., A CORPORATION OF NEW YORK.

BATTERY-SEAL.

1,325,338.   Specification of Letters Patent.   Patented Dec. 16, 1919.

Application filed April 24, 1918. Serial No. 230,434.

*To all whom it may concern:*

Be it known that I, NORMAN D. STURGES, a citizen of the United States, residing in Brooklyn, county of Kings, and State of New York, have invented certain new and useful Improvements in Battery-Seals, of which the following is a full, clear, and exact description.

My invention relates to battery seals of a kind suitable for general use upon batteries of different types, but specially adapted for storage batteries.

The purpose of my invention is to enable a perfect seal to be made between the battery lid or cover and a terminal post or battery electrode extending through a hole therein.

It will be noted that in storage batteries, as now constructed, there are usually two terminal posts, each extending through a hole in the battery lid. In order to prevent the creep of acids or other battery fluid between the terminal post and the adjacent surface of the battery lid, and also to prevent the escape of gas from the battery, various kinds of seals have heretofore been employed. The battery lid or cover is usually made of insulating material, preferably some composition approximating hard rubber.

What I seek more particularly to do by my invention is to provide a simple joint between the battery terminal post and the battery cover, so arranged that the cover may easily be placed over the post and then, by soldering or some equivalent operation, the terminal post may be effectively sealed to the battery cover or to some member forming practically an integral part thereof.

Reference is made to the accompanying drawing forming a part of this specification, and in which like reference characters indicate like parts throughout the several figures.

The battery cover is shown at 4 and may be made of hard rubber or some composition having substantially the consistency of hard rubber. This is, of course, insulating material.

The cover may, if desired, be provided as in this instance with a skirt 5 for overhanging the outer edges of the battery jar. The cover is further provided with necks 6, 7, 8, integral with it. The neck 7 is used for purposes of pouring battery fluid through the cover and may be closed with a stopper or in any other convenient manner. The necks 6 and 8 are for the purpose of encircling a pair of electrodes 9, 10 made of zinc or other appropriate metal, and connected with the battery grids in the usual or any desired manner.

Figure 1:
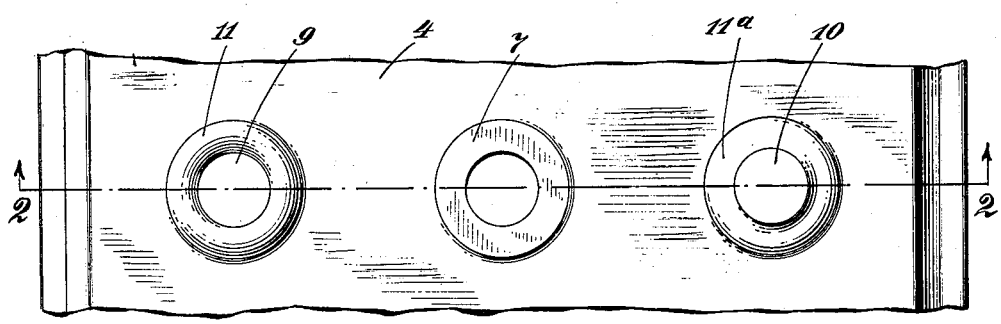
Figure 1 is a fragmentary plan view of a battery cover embodying one form of my invention.
Figure 2:
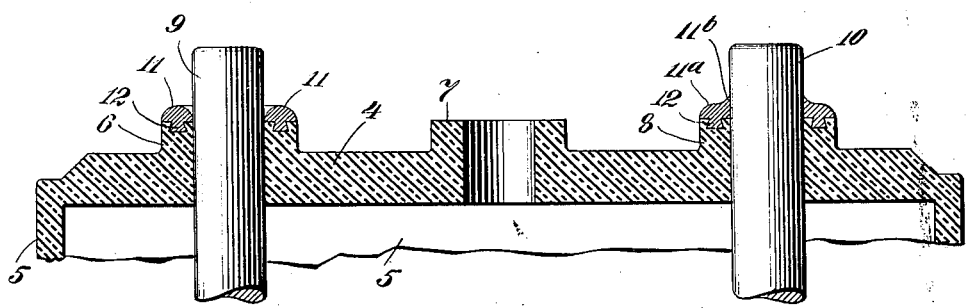
Fig. 2 is a section through the same upon the line 2—2 of Fig. 1, looking in the direction of the arrows.
Figure 3:
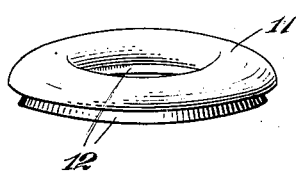
Fig. 3 is a perspective of one form of my improved sealing ring forming in practice essentially a part of the battery cover.

My improved sealing ring is shown in Fig. 3. Mounted upon the neck 6 is a ring 11 made of soft metal such as lead, zinc or an alloy corresponding to solder, as desired. This ring has originally the proximate form of a semi-cylinder, as may be seen at the left of Fig. 2, and is provided with an anchorage 12. This anchorage is merely a base portion of the ring and has a general annular form, as may be understood from Fig. 3. The base 12 is a little wider at its bottom than at its top and the adjacent portion of the neck 6 fits neatly around it. The practical effect is the same as if the neck 6 were undercut, though in practice the neck, along with other portions of the cover 4, is vulcanized in position. That is to say, the ring 11 is vulcanized upon the top of the neck 6. The neck 8 carries a ring 11$^a$ provided with an annular base 12. This ring 11$^a$ differs from the ring 11 merely in the fact that, after being placed in position, it has undergone a further operation, as will be understood from the right of Fig. 2. That is to say, the ring has been soldered to the terminal post 10 and therefore has assumed a slightly different form due to the act of soldering, the principal change being indicated at the point 11$^b$, where the metal of the ring is piled up slightly around the terminal post.

In practice the cover 4 is placed over the battery so that the posts 10 protrude upwardly through the necks 6 and 8. A workman then takes a soldering iron or its equivalent and by using it upon each metallic ring 11 produces a hermetical seal as between this ring and the terminal post. At the beginning of the operation the ring has the appearance indicated at 11 in Fig. 2, and at the end of the operation it has the appearance indicated at 11ª at the right of Fig. 2.

It will be noted that, while the seal thus formed is located at the extreme upper portion of the neck 6 or 8, no acid or other battery fluid can find its way out of the battery by creeping upwardly along the surface of the terminal post. The liquid cannot creep out underneath the annular base 12 of the sealing ring because a joint made by vulcanizing in the instances where a good anchorage is afforded, as in this case, can be very readily rendered liquid-tight, or even gas-tight.

The sealing ring, having the proximate form shown in Fig. 3, may be made and sold separately as an article of manufacture. Again, the battery cover adapted for carrying the sealing ring and either actually provided with the sealing ring or not, as desired, may also be treated as an article of manufacture.

I do not limit myself to the precise mechanism shown, as variations may be made therein without departing from the spirit of my invention, the scope of which is commensurate with my claims.

I claim:—

1. As an article of manufacture, a battery cover made of composition having general properties approximating those of hard rubber and provided with a hole extending through it, and an annular member provided with an annular wall thickened at its base in order to anchor it firmly to the material of the cover, said annular member being made of metal capable of being soldered.

2. As an article of manufacture a battery cover made of insulating material and provided with a hole extending through it, and a metallic member encircling said hole and provided with an extending portion embedded in said cover, said extending portion having the form of a short annular wall thickened at its bottom in order to undercut the material of the cover both internally of the annular wall and externally thereof.

NORMAN D. STURGES.